UNITED STATES PATENT OFFICE.

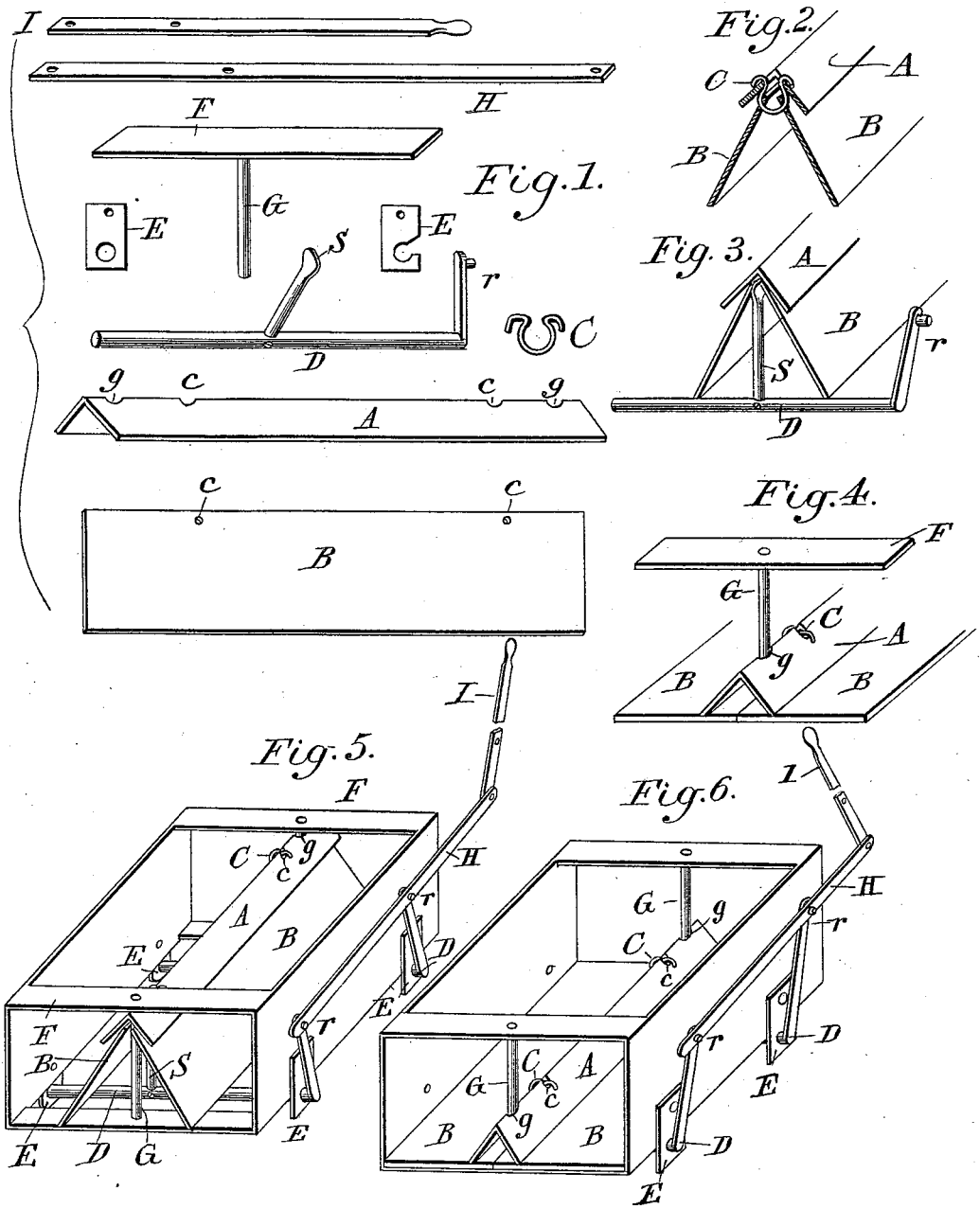

WILLIAM J. NORTON, OF CLINTON, MISSOURI.

ASH-PAN BOTTOM FOR LOCOMOTIVES.

SPECIFICATION forming part of Letters Patent No. 536,648, dated April 2, 1895.

Application filed October 12, 1894. Serial No. 525,687. (No model.)

*To all whom it may concern:*

Be it known that I, WILLIAM J. NORTON, a citizen of the United States, residing at Clinton, in the county of Henry and State of Missouri, have invented a new and useful Ash-Pan Bottom for Locomotives, of which the following is a specification.

My invention relates to an ash-pan bottom from which ashes or cinders may be dumped instead of hoeing them out as is the practice from the common ash-pan.

The first advantage claimed for this ash-pan bottom is quick and efficient dumping; second, an easy matter to keep ash-pan clean thereby saving grates as grates seldom if ever burn out when ash-pan is reasonably clean; third, the ashpan may be cleaned from the locomotive cab without going under the locomotive with ash hoe; fourth, a saving of loss of time and money to railroad companies caused by loss of service of locomotive while repairs are being made when grates burn out. I attain this object by the mechanism illustrated in the accompanying drawings.

Similar letters refer to similar parts throughout the several views.

Figure 1 shows the component parts as follows: Fig. 2, illustrates the connection of the angle iron A, and bottom pieces B, by the loop or hinge C, which would not be so liable to stick as a common hinge. Fig. 3, shows the position of the bottom pieces B, when the arms s, of the tumbling shaft D, are raised. Fig. 4 shows crosspiece F, and guide rod G, with bottom pieces B, down or closed. Fig. 5, is a view of ash-pan with bottom open to discharge contents. Fig. 6, is a view of ash-pan with bottom closed.

A, is an angle iron with holes c, c, and g, g, as shown in drawings; B, bottom pieces or wings with holes c, c, near one edge.

C, are loops or hinge pieces by which the pieces A and B are connected as shown in Fig. 2.

D, is a tumbling shaft with arms r, and s, and is hung beneath the pan by hangers.

E, are hangers by which the tumbling shafts D, of which there are two, are attached to the pan as shown in drawings; F, cross piece which carries the guide rods G; G, guide rods, which extend downward from crosspiece F, pass through the holes g, in A, and are secured at their bottom ends in the end pieces of pan as shown in Fig. 5. The holes g, in angle iron A, should be large enough to work freely on the guides G.

H, is the reach rod and is connected with arms r, of tumbling shaft D, and also lower end of lever I, as shown in drawings.

I, is the lever the lower end of which is connected with the reach rod H, and the upper end extending into the locomotive cab where it should be suitably secured at the forward stroke at such a point as will bring the arms s, of tumbling shafts D, in a horizontal position, thereby closing the bottom of the ash-pan as in Fig. 6.

As will be seen from the drawings when the lever I, is pulled back the arms s, of the tumbling shaft D, will be raised, thereby opening the bottom of the ash-pan as in Figs. 3, and 5, and allowing the contents to escape.

I am aware that most of the common locomotive ash-pans are too wide and shallow to allow the bottom to be made in one section, as described, but in such pans two or more sections could be used by adding one or more guide rods G, to the cross piece F, and one or more arms s, to the tumbling shaft D, with angle-iron A, bottom pieces B and hinges C, as heretofore described.

What I claim as my invention, and desire to secure by Letters Patent, is—

A dumping ash-pan bottom for locomotives, composed of the combination of the several parts, angle iron A, bottom pieces B, hinges C, tumbling shaft D, hangers E, crosspieces F, guide rods G, connecting rod H, and lever I, as set forth by specification and drawings, and to be made in one or more sections as the dimensions of ash-pans of different locomotives may require.

WILLIAM J. NORTON.

Witnesses:
FRANK P. DAUM,
DAVID P. DAUM.